United States Patent
Lin et al.

(10) Patent No.: US 11,117,047 B2
(45) Date of Patent: Sep. 14, 2021

(54) GAMING OPERATIONAL STAGE FOR VIRTUAL REALITY APPLICATION

(71) Applicant: ACER INCORPORATED, New Taipei (TW)

(72) Inventors: Jia-Yu Lin, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 172 days.

(21) Appl. No.: 16/524,152

(22) Filed: Jul. 28, 2019

(65) Prior Publication Data

US 2020/0179796 A1   Jun. 11, 2020

(30) Foreign Application Priority Data

Dec. 11, 2018  (TW) .................................. 107144437

(51) Int. Cl.
| | |
|---|---|
| *A63F 13/212* | (2014.01) |
| *A63F 13/24* | (2014.01) |
| *A63F 13/211* | (2014.01) |
| *G06T 19/00* | (2011.01) |
| *A63F 13/214* | (2014.01) |
| *A63F 13/28* | (2014.01) |
| *A63F 13/213* | (2014.01) |

(52) U.S. Cl.
CPC .......... *A63F 13/212* (2014.09); *A63F 13/211* (2014.09); *A63F 13/213* (2014.09); *A63F 13/214* (2014.09); *A63F 13/24* (2014.09); *A63F 13/28* (2014.09); *G06T 19/003* (2013.01)

(58) Field of Classification Search
None
See application file for complete search history.

(56) References Cited

U.S. PATENT DOCUMENTS

| | | | | |
|---|---|---|---|---|
| 5,409,226 A | * | 4/1995 | Mesko | A63F 13/06 273/148 B |
| 6,624,802 B1 | * | 9/2003 | Klein | A63F 13/06 345/156 |
| 10,890,976 B2 | * | 1/2021 | Welch | G06F 3/011 |
| 2002/0055383 A1 | * | 5/2002 | Onda | A63F 13/212 463/36 |

(Continued)

FOREIGN PATENT DOCUMENTS

| | | |
|---|---|---|
| CN | 104111446 A | 10/2014 |
| CN | 106233227 A | 12/2016 |
| CN | 108325190 A | 7/2018 |

*Primary Examiner* — James S. McClellan
*Assistant Examiner* — Peter J Iannuzzi
(74) *Attorney, Agent, or Firm* — Winston Hsu

(57) ABSTRACT

A VR gaming operational stage includes a display device, a standing platform, a limb movement detector, an eye-gaze analyzer, an adjustment device, and a micro controller. The standing platform is configured to detect the center of gravity of a user. The limb movement detector is configured to detect the limb movement of the user. The eye-gaze analyzer is configured to determine the body orientation of the user. According to the data acquired by the standing platform, the limb movement detector and the eye-gaze analyzer, the micro controller is configured to instruct the display device to present corresponding VR contents and instruct the adjustment device to provide corresponding force feedback.

19 Claims, 15 Drawing Sheets

(56) References Cited

U.S. PATENT DOCUMENTS

| | | | | |
|---|---|---|---|---|
| 2012/0051588 A1* | 3/2012 | McEldowney | ........ | G03B 21/14 |
| | | | | 382/103 |
| 2014/0274564 A1* | 9/2014 | Greenbaum | ............ | A63F 13/28 |
| | | | | 482/5 |
| 2015/0352441 A1* | 12/2015 | Lin | ........................ | A63F 13/214 |
| | | | | 463/36 |
| 2017/0252642 A1* | 9/2017 | Matina | ..................... | A63F 13/98 |

\* cited by examiner

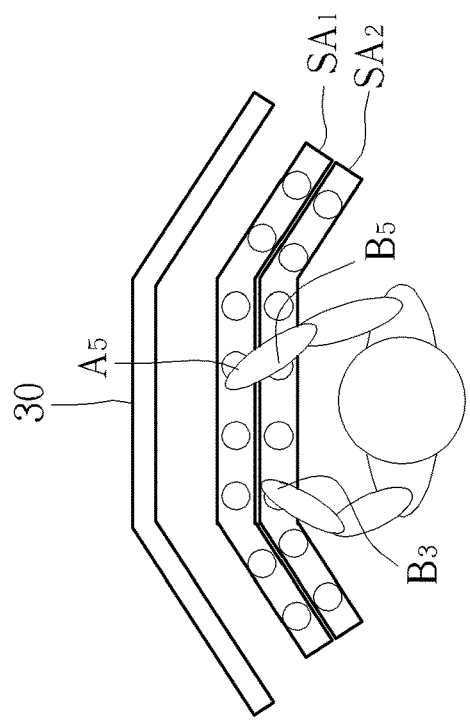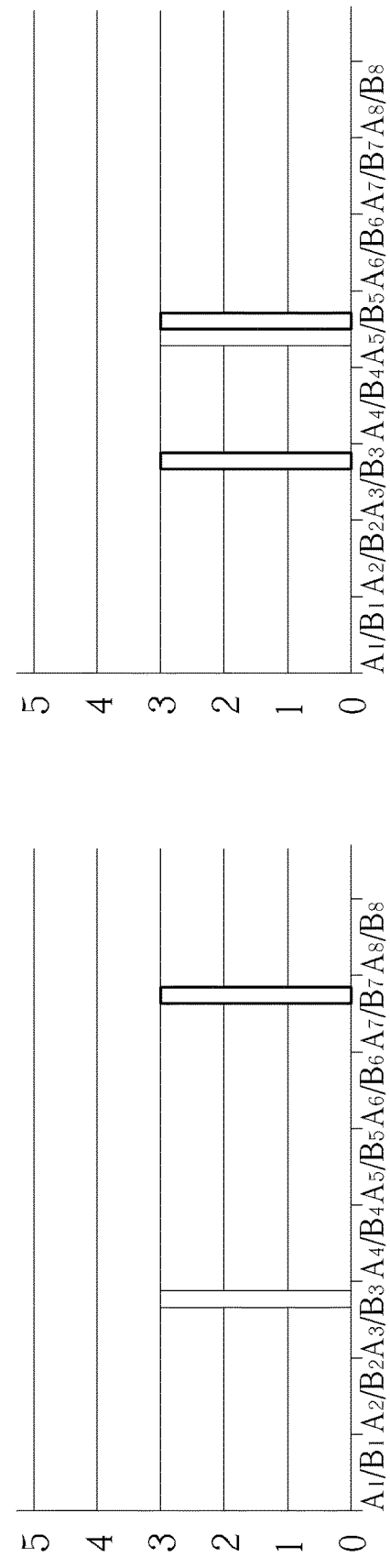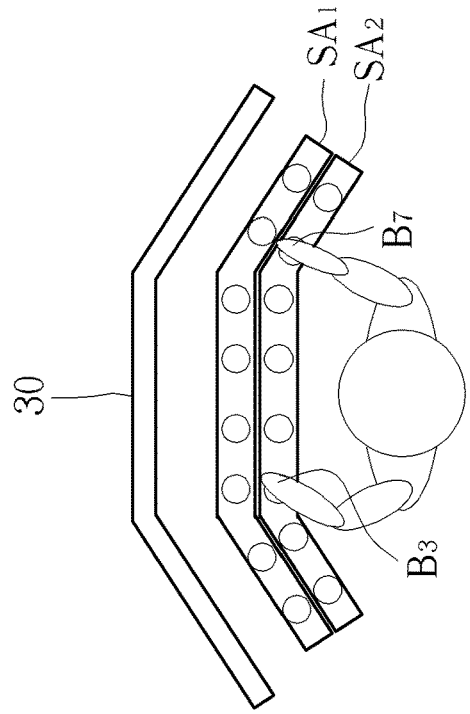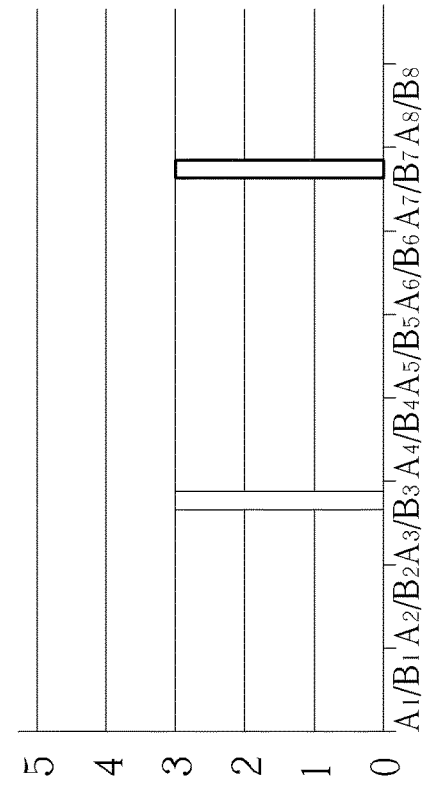
FIG. 9A
FIG. 9B

US 11,117,047 B2

GAMING OPERATIONAL STAGE FOR VIRTUAL REALITY APPLICATION

CROSS REFERENCE TO RELATED APPLICATION

This application claims priority of Taiwan Application No. 107144437 filed on 2018 Dec. 11.

BACKGROUND OF THE INVENTION

1. Field of the Invention

The present invention is related to a gaming operational stage for VR application, and more particularly, to a gaming operational stage for VR application which detects the center of gravity, gestures and body orientation of a user.

2. Description of the Prior Art

Virtual reality (VR) is an interactive computer-generated experience taking place within a simulated environment, that incorporates mainly auditory and visual, but also other types of sensory feedback like haptic. VR technologies provide a user wearing special display equipment with an immersive environment similar to the real world and allow the user to interact with a VR object or other users. Since VR applications emphasize immersion into virtual reality, it is important to create the perception of being physically present in a non-physical world by surrounding the user in images, sound or other stimuli that provide an engrossing total environment.

Existing gaming operational stages are designed for specific VR applications. For example, a dancing stage can only be used in music games, a turret stage can only be used in combat games, and a treadmill stage can only be used in sport games. In order to run various VR applications, a user needs to use or buy various application-specific gaming operational stages. Such low compatibility causes extra costs and inconveniences.

SUMMARY OF THE INVENTION

The present invention provides a gaming operational stage for a VR application which includes a display device, a standing platform and a system end. The standing platform includes a base, a universal bearing configured to accommodate the base and provide a first degree of freedom and a second degree of freedom when a user is on the base, a plurality of auxiliary springs disposed between a lower side of the base and a reference ground for sustaining a balance of the base, and a plurality of distance sensors disposed on the lower side of the base for detecting distances between the reference ground and a plurality of locations on the base. The system end includes a host configured to provide an audio/video data required to run the VR application, and a micro controller configured to control the display device to present a corresponding content of the VR application according to distance information provided by the plurality of distance sensors.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 9A~9B are diagrams illustrating the operation of a limb movement detector in the gaming operational stage according to an embodiment of the present invention.

DETAILED DESCRIPTION

Figure 1:
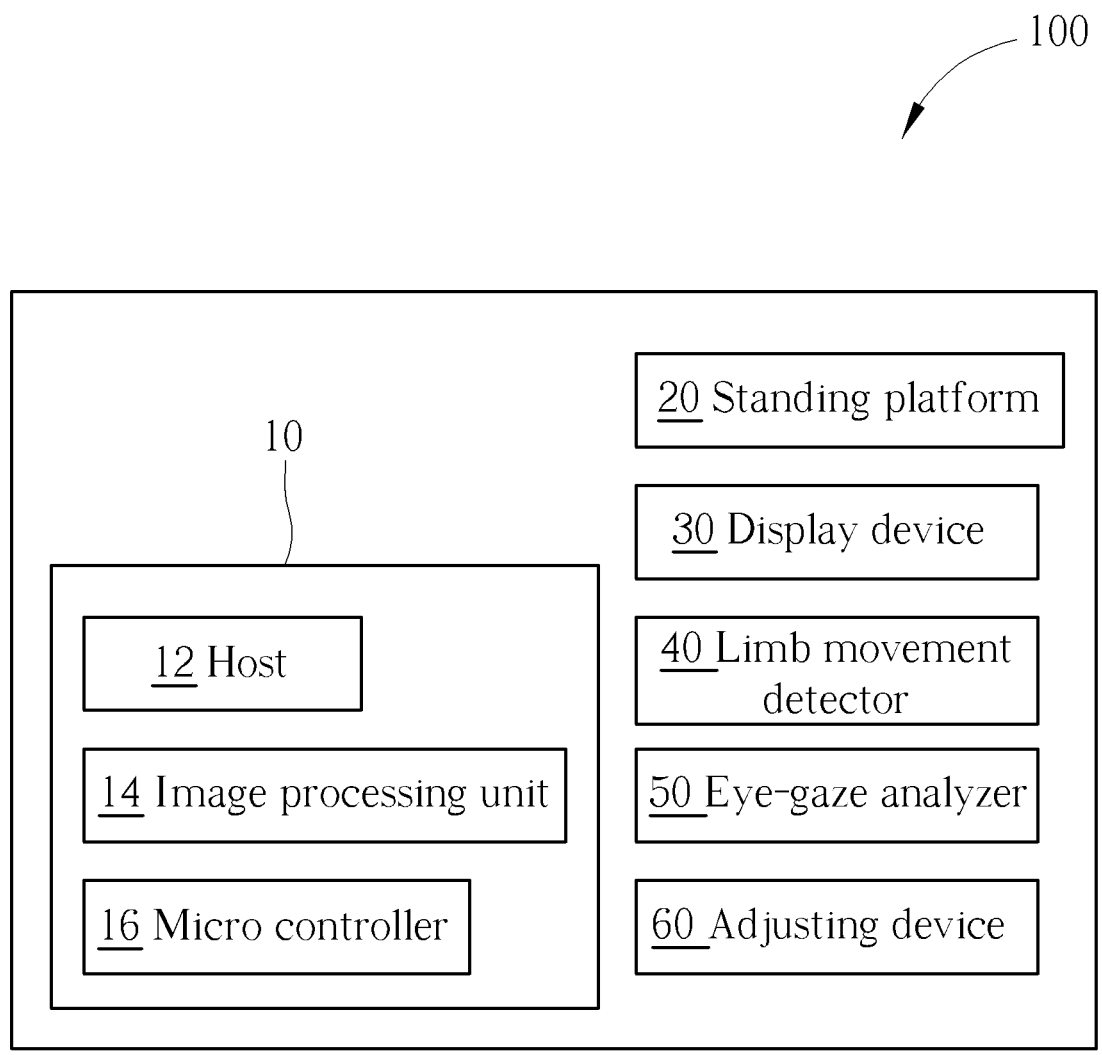
FIG. 1 is a functional diagram illustrating a gaming operational stage for VR application according to an embodiment of the present invention

FIG. 1 is a functional diagram illustrating a gaming operational stage 100 for VR application according to an embodiment of the present invention. The gaming operational stage 100 includes a system end 10, a standing platform 20, a display device 30, a limb movement detector 40, an eye-gaze analyzer 50, and an adjusting device 60.

The system end 10 includes a host 12, an image processing unit 14 and a micro controller 16. The host 12 is configured to provide the audio/video data for running various VR applications. The image processing unit 14 is configured to process the audio/video data received from the host 12 for presentation on the display device 30. The micro controller 16 is configured to operate each device of the gaming operational stage 100 according to the audio/video data provided by the host 12, movement information provided by the limb movement detector 40 and eye-gaze information provided by the eye-gaze analyzer 50, thereby providing corresponding visual effect and force feedback. In an embodiment of the present invention, the system end 10 may be disposed on any location of the gaming operational stage 100 as long as it does not interfere with the process of VR applications. However, the implementation of the system end 10 does not limit the scope of the present invention.

Figure 2:
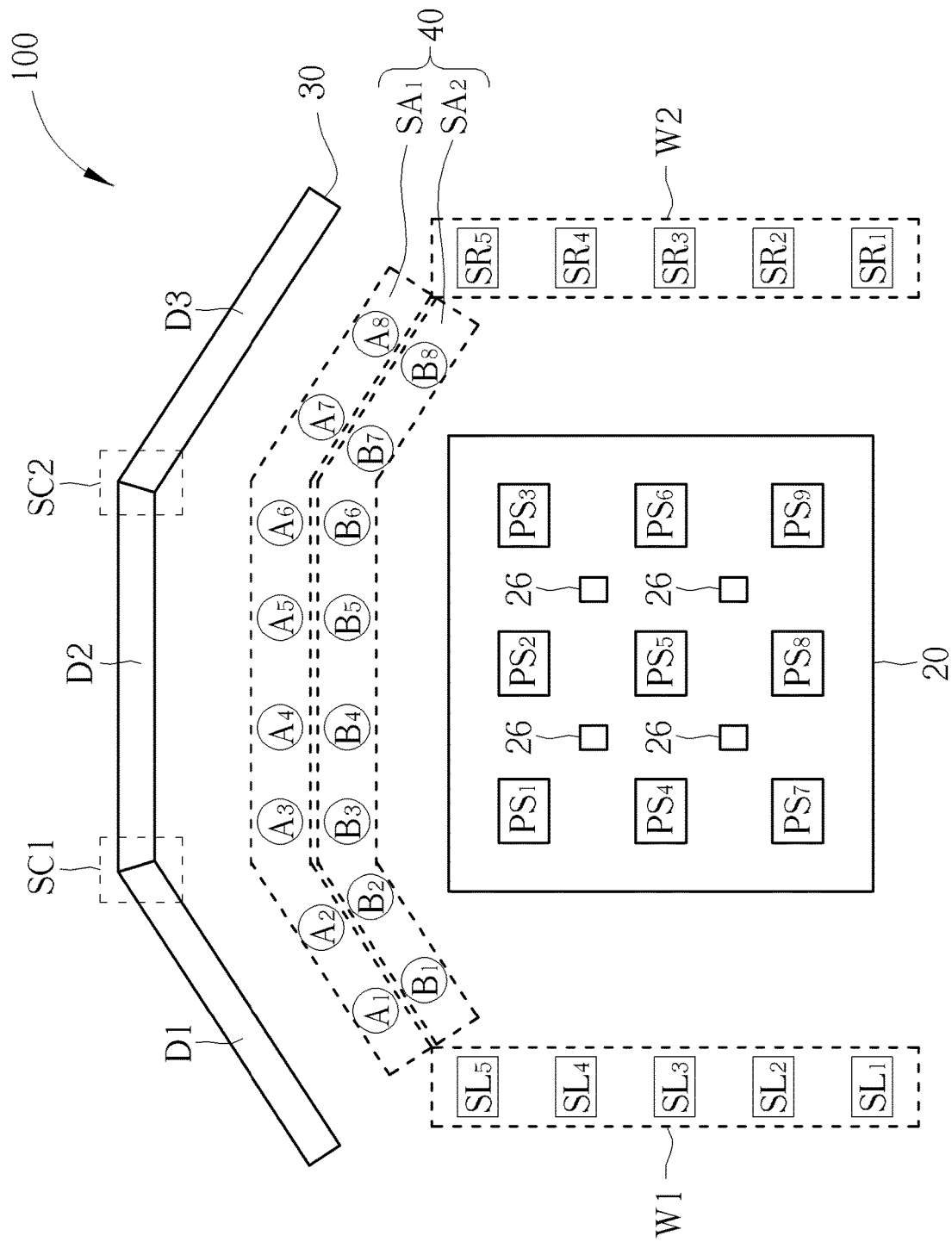
FIG. 2 is a top-view diagram illustrating an implementation of the gaming operational stage according to an embodiment of the present invention.
Figure 3:
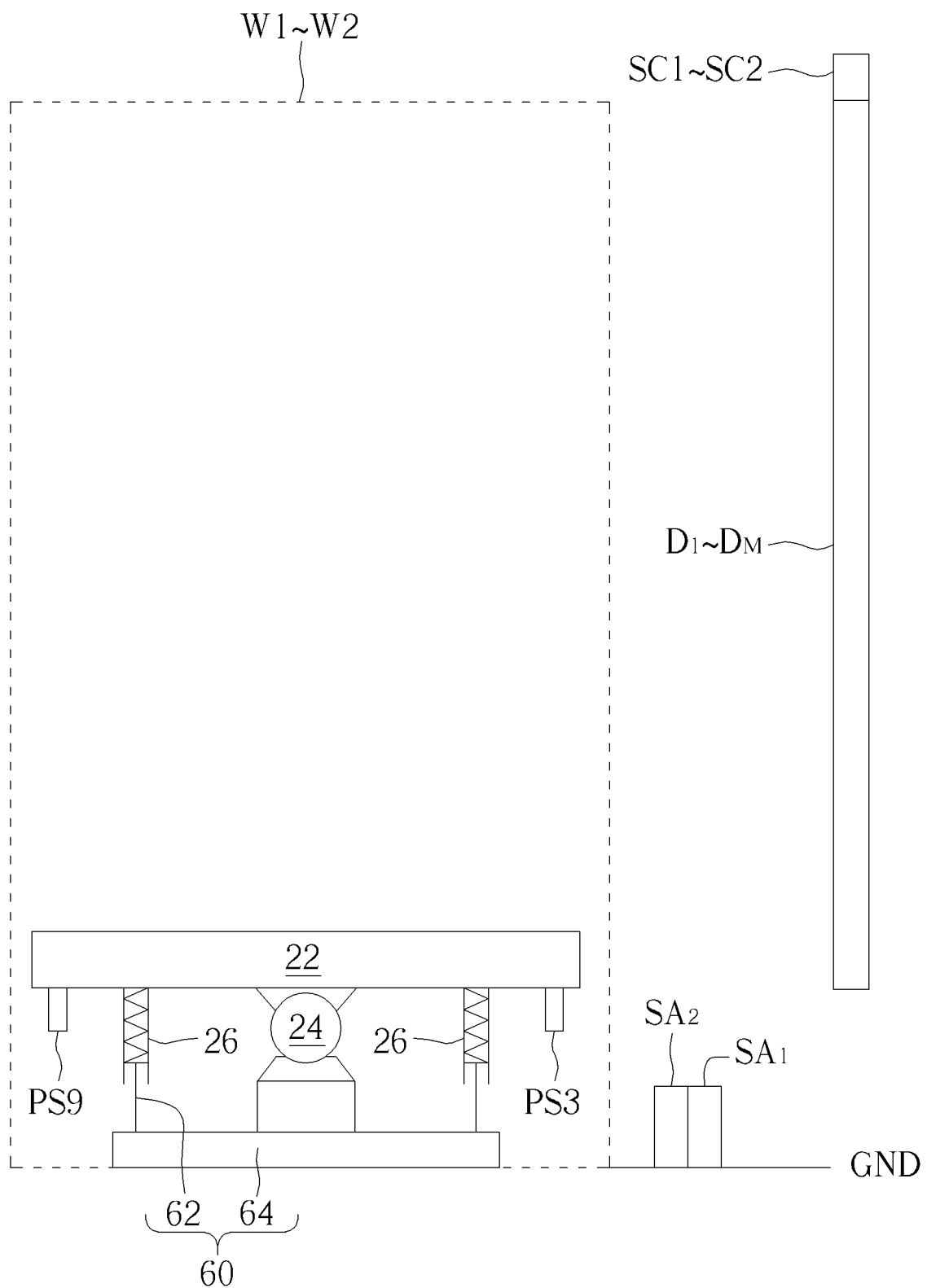
FIG. 3 is a side-view diagram illustrating an implementation of the gaming operational stage according to an embodiment of the present invention.
Figure 4A:
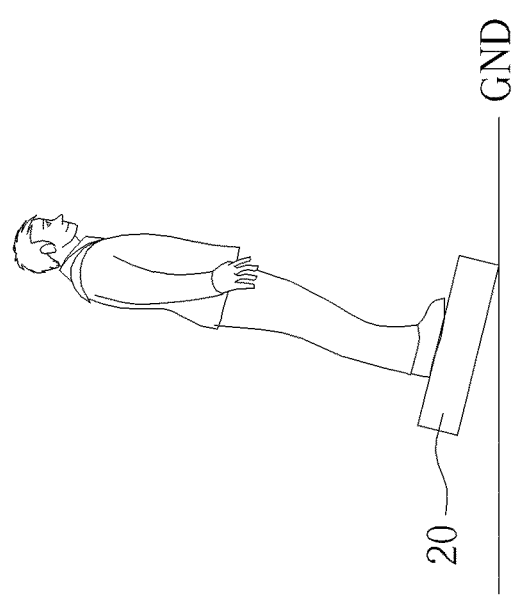
FIGS. 4A~4D are diagrams illustrating the operation of a standing platform in the gaming operational stage according to an embodiment of the present invention.
Figure 4A:
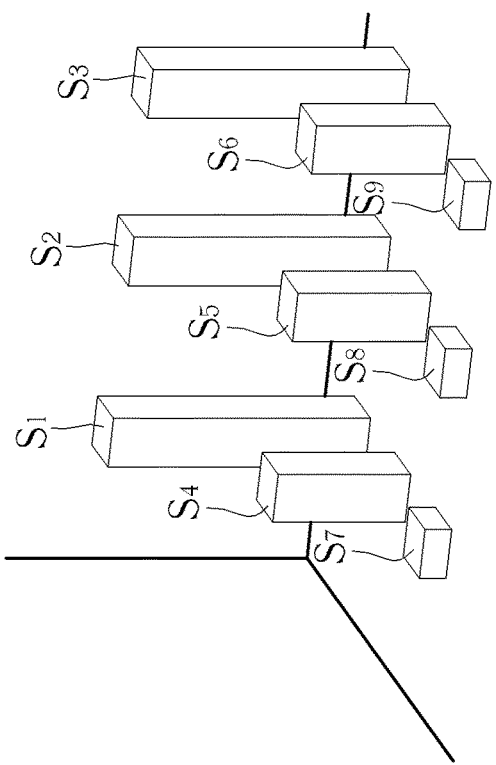
Figure 4B:
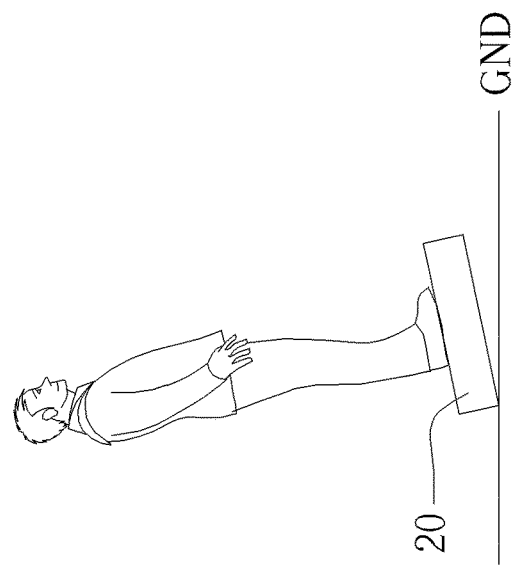
Figure 4B:
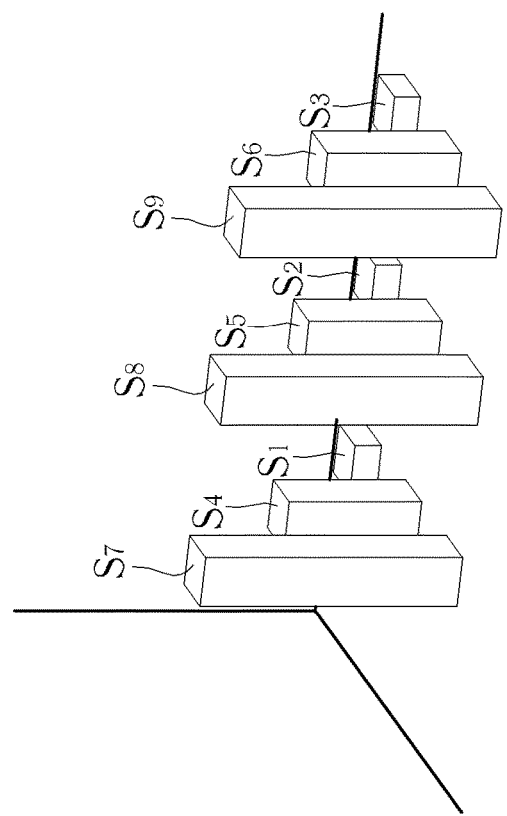
Figure 4C:
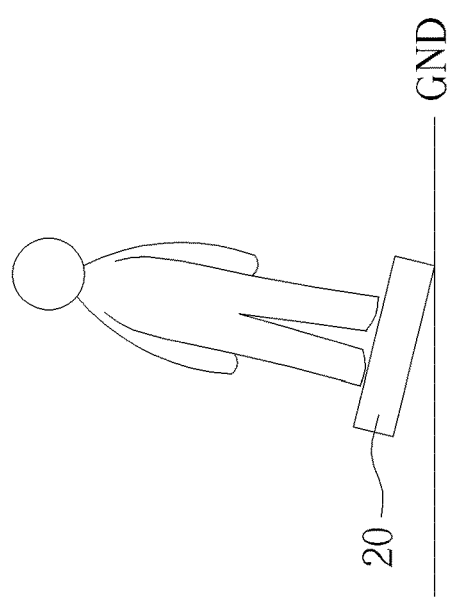
Figure 4C:
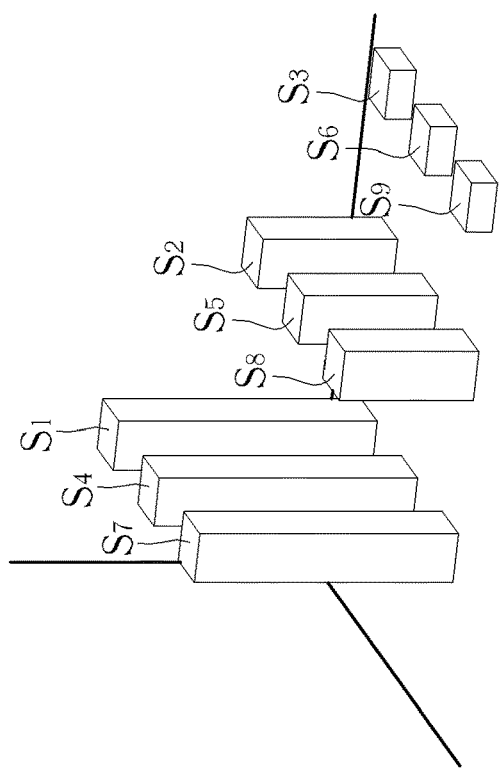
Figure 4D:
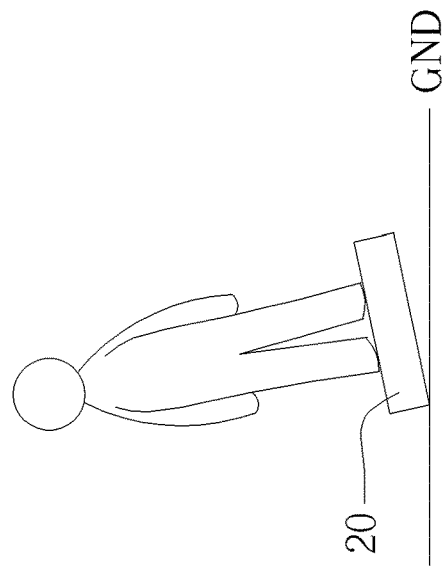
Figure 4D:
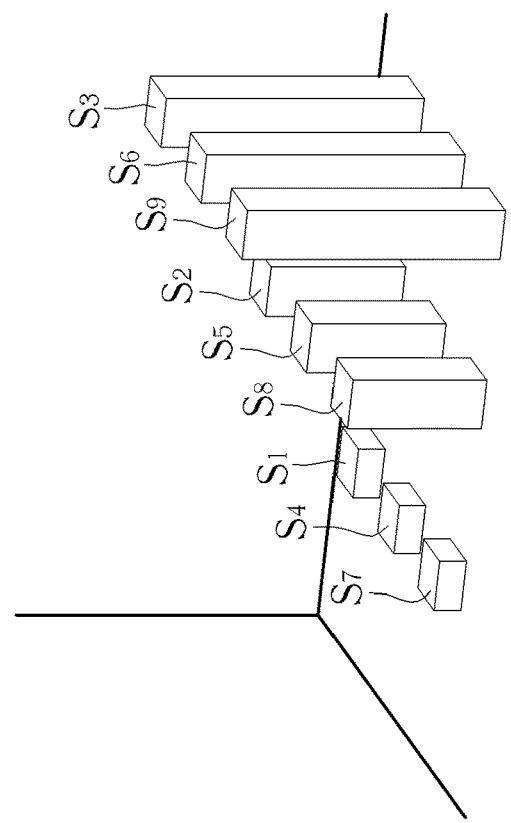

FIG. 2 is a top-view diagram illustrating an implementation of the gaming operational stage 100 according to an embodiment of the present invention. FIG. 3 is a side-view diagram illustrating an implementation of the gaming operational stage 100 according to an embodiment of the present invention. In the perspective of a user on the standing platform 20, the display device 30 is located in front of the standing platform 20 and includes one or multiple screens $D_1 \sim D_M$ (M is a positive integer). For illustrative purpose, FIG. 2 depicts the embodiment when M=3. However, the number of screens included in the display device 30 does not limit the scope of the present invention.

As depicted in FIG. 3, the standing platform 20 includes a base 22, a universal bearing 24, a plurality of auxiliary springs 26, and a plurality of distance sensors $PS_1 \sim PS_N$ (N is an integer larger than 1). The universal bearing 24 is configured to accommodate the base and provide a first degree of freedom (tilting forwards/backwards) and a second degree of freedom (tilting to the right/left) when the user is on the base 22. The auxiliary springs 26 are disposed between the lower side of the base 22 and a reference ground GNS for sustaining the balance of the base 22. The distance sensors $PS_1 \sim PS_N$ are disposed on the lower side of the base 22 for detecting the distances between the reference ground GND and various locations of the base 22. For illustrative purpose, FIG. 2 depicts the embodiment with 4 auxiliary springs 26 and when N=9. However, the number of distance sensors or the auxiliary springs does not limit the scope of the present invention.

FIGS. 4A~4D are diagrams illustrating the operation of the standing platform 20 in the gaming operational stage 100 according to an embodiment of the present invention. On the top of FIGS. 4A~4D, a user on the standing platform 20 leans forward, backward, to the right and to the left, respectively. On the bottom of FIGS. 4A-4D, the signals $S_1 \sim S_9$ measured by the distance sensors $PS_1 \sim PS_9$ associated with corresponding user postures are depicted, wherein a larger signal means a corresponding distance sensor is closer to the reference ground GND. According the signals measured by the distance sensors $PS_1 \sim PS_M$, the micro controller 16 is able to determine the posture of the user and instruct the display device 30 to present corresponding VR contents associated with forward-leaning, backward-leaning, right-leaning or left-leaning.

Figure 5A:
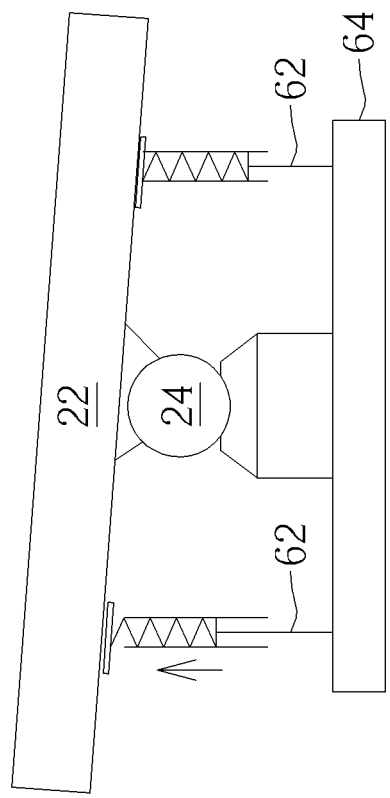
FIGS. 5A~5B are diagrams illustrating the operation of a standing platform and an adjusting device in the gaming operational stage according to an embodiment of the present invention.
Figure 5B:
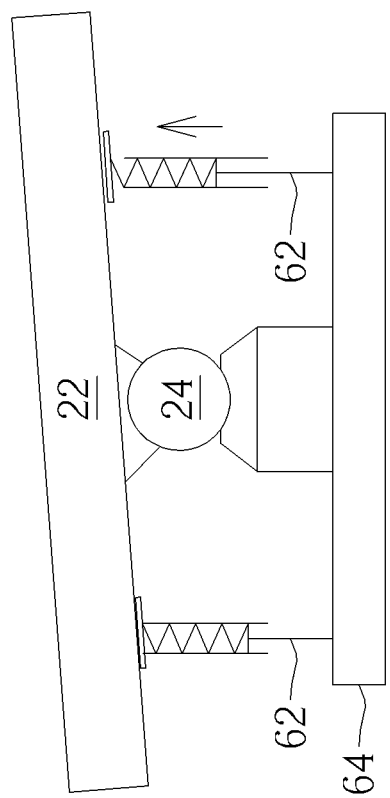
Figure 6:
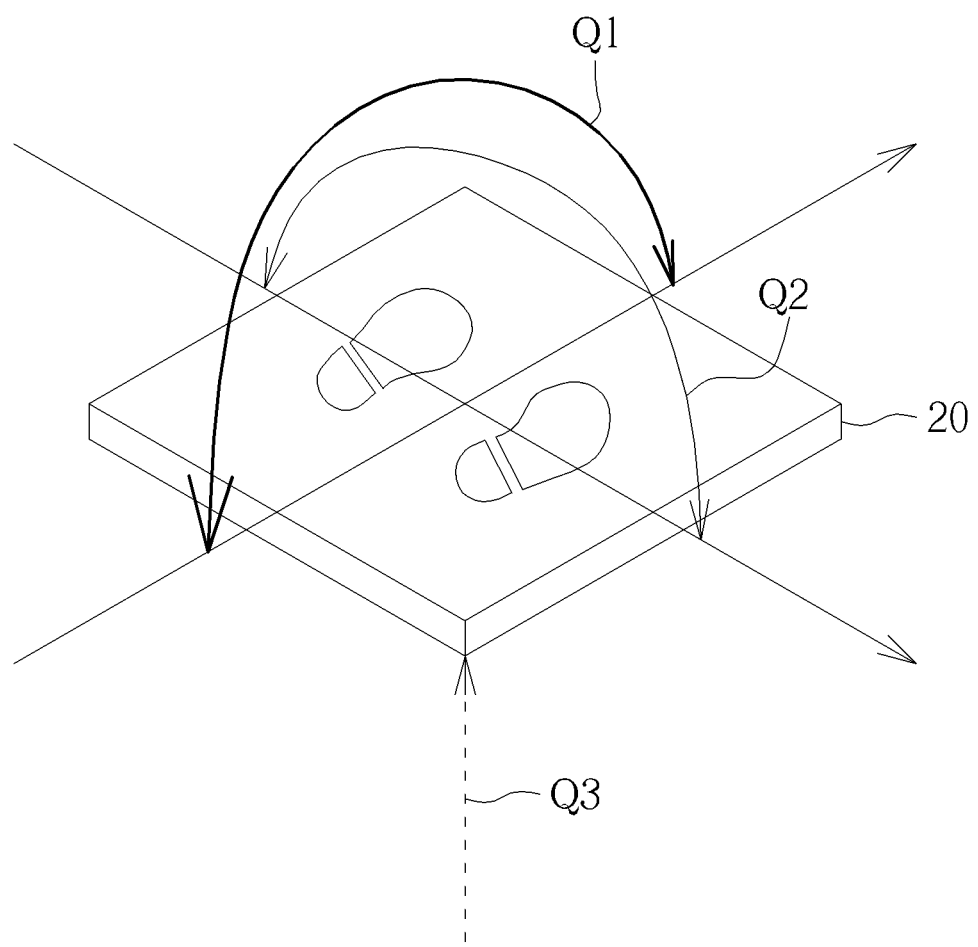
FIG. 6 is a diagram illustrating the operation of a standing platform in the gaming operational stage according to an embodiment of the present invention.

As depicted in FIG. 3, the adjusting device 60 includes levers 62 and a power device 64. The levers 62 may adopt a screw mechanism or a gear mechanism, and the power device 64 may be a motor. The micro controller 16 may control the power device 64 to elevate a specific lever 62, thereby compressing a corresponding auxiliary spring 26 for providing a force feedback or a vibration required by the VR application. FIGS. 5A~5B are diagrams illustrating the operation of the standing platform 20 and the adjusting device 60 in the gaming operational stage 100 according to an embodiment of the present invention. As depicted in FIGS. 5A~5B, the power device 64 may elevate various levers 62 to compress corresponding auxiliary springs 26 with different strengths or frequencies, thereby providing a third degree of freedom along the vertical direction (represented by the arrows in FIGS. 5A~5B) for providing the force feedback required by the VR application FIG. 6 is a diagram illustrating the operation of the standing platform 20 in the gaming operational stage 100 according to an embodiment of the present invention. Using the universal bearing 24, the standing platform 20 is able to provide the first degree of freedom associated with forward/backward leaning (represented by the arrow Q1) and the second degree of freedom associated with left/right leaning (represented by the arrow Q2). Using the adjusting device 60, the standing platform 20 is able to provide the third degree of freedom along the vertical direction (represented by the arrow Q3).

In the gaming operational stage 100 of the present invention, the limb movement detector 40 includes a plurality of distance sensing arrays $SA_1 \sim SA_P$ (P is an integer larger than 1) disposed on the reference ground GND between the standing platform 20 and the display device 30. Each distance sensing array includes a plurality of distance sensors facing upwards and is configured to detect the limb movement of the user on the standing platform 20. For illustrative purpose, FIG. 2 depicts the embodiment when N=2, wherein the distance sensing array $SA_1$ includes 8 distance sensors A1~A8 and the distance sensing array $SA_2$ includes 8 distance sensors B1~B8. The distance sensors in the distance sensing arrays $SA_1 \sim SA_P$ may adopt ultrasonic, laser or infrared technology. However, the amount and the type of the distance sensing arrays do not limit the scope of the present invention.

Figure 7A:
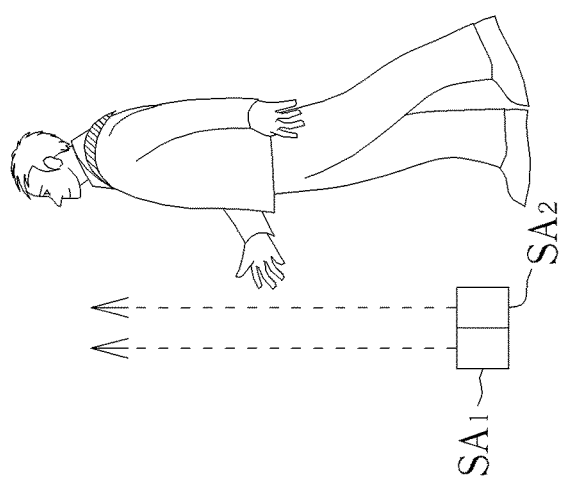
FIGS. 7A~7D are diagrams illustrating the operation of a limb movement detector in the gaming operational stage according to an embodiment of the present invention.
Figure 7A:
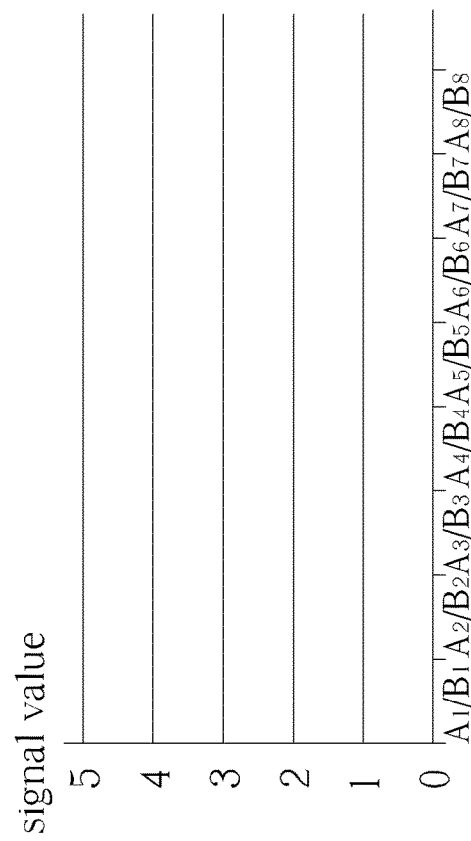
Figure 7B:
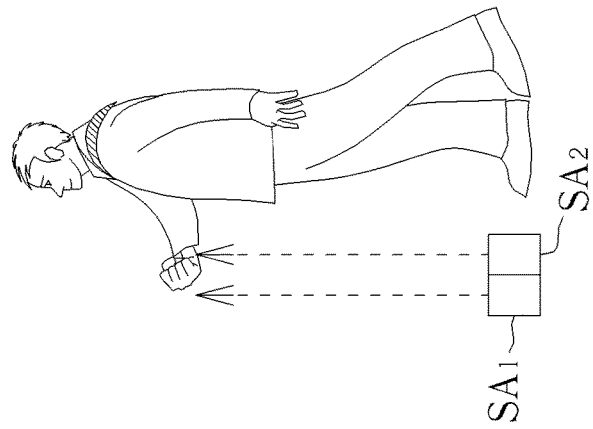
Figure 7B:
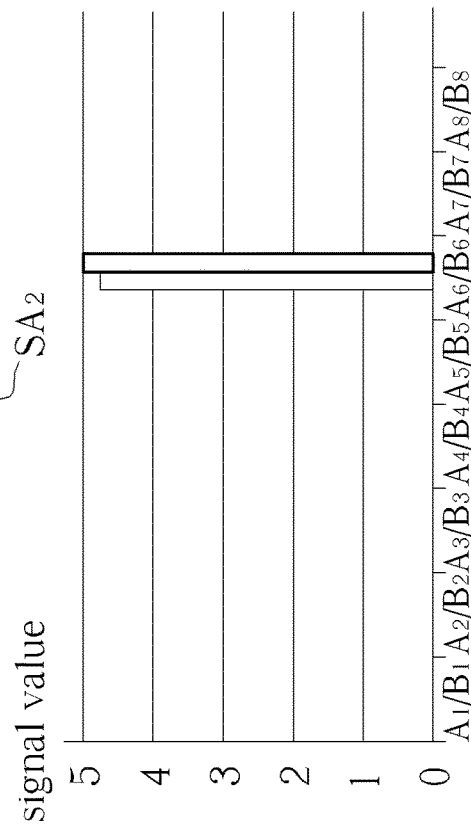
Figure 7C:
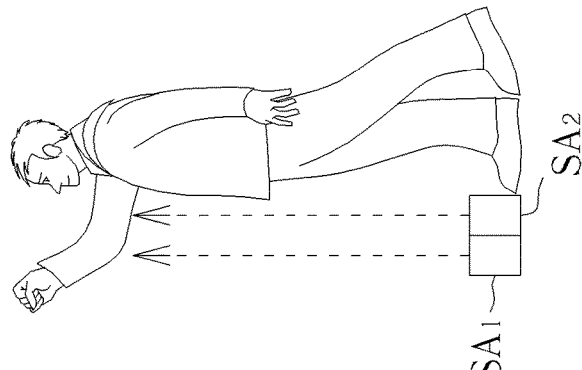
Figure 7C:
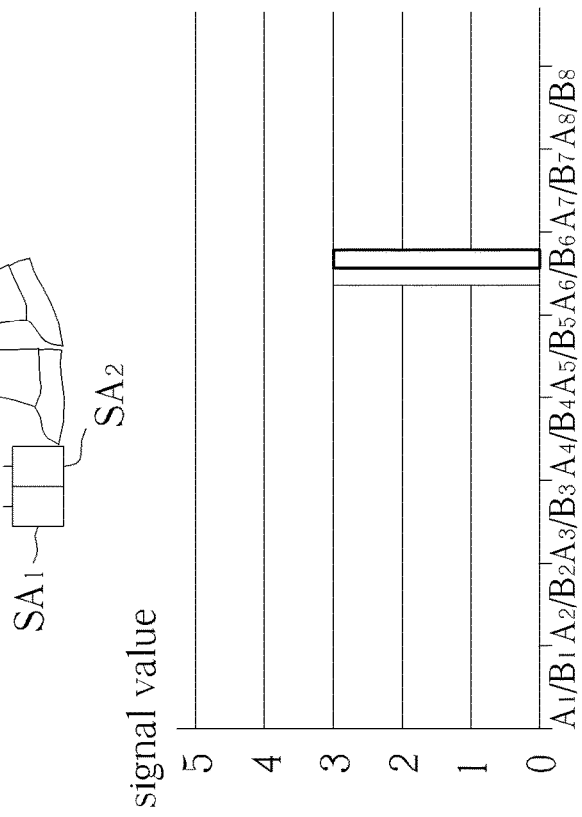
Figure 7D:
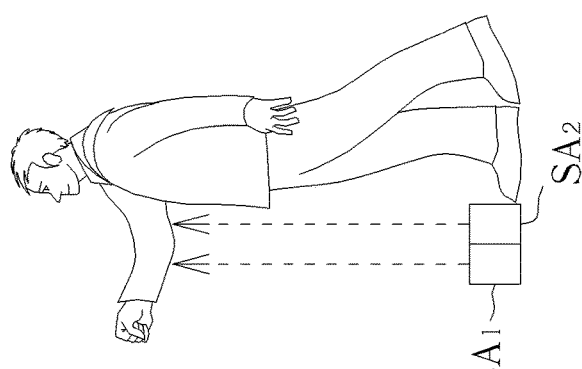
Figure 7D:
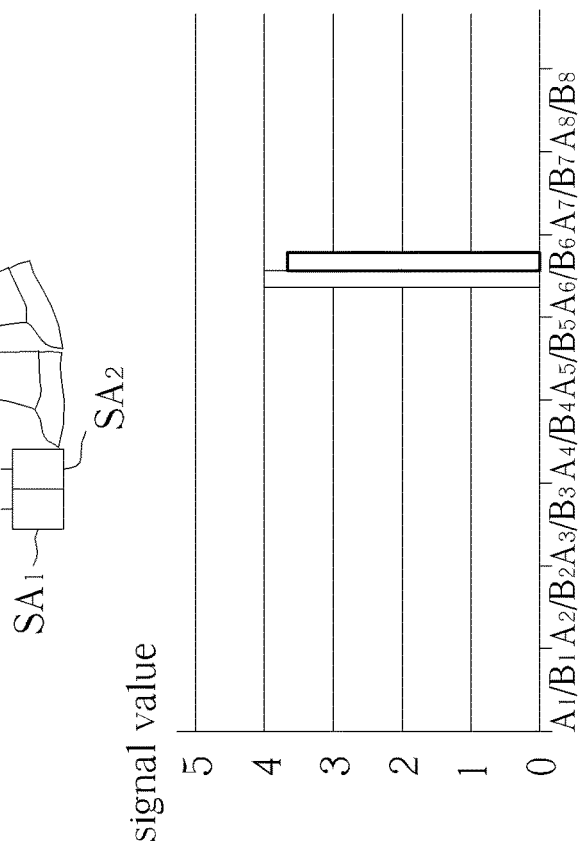

FIGS. 7A~7D are diagrams illustrating the operation of the limb movement detector 40 according to an embodiment of the present invention. The process of a user throwing a right uppercut on the standing platform 20 is sequentially depicted on the top of FIGS. 7A~7D. On the bottom of FIGS. 7A~7D, the signals measured by each distance sensor of the distance sensing array $SA_1 \sim SA_2$ associated with corresponding user postures are depicted. As depicted in FIG. 7A before the user waves his right fist, the distance sensing array $SA_1 \sim SA_2$ do not detect any obstacle and the signal measured by each distance sensor is substantially zero. As depicted in FIGS. 7b~7D when the user is waving his right fist, only the corresponding distance sensors A6 and B6 in the distance sensing array $SA_1 \sim SA_2$ detect an obstacle, wherein a larger signal means a corresponding distance sensor is closer to the reference ground GND. According the signals measured by the distance sensing array $SA_1 \sim SA_P$, the micro controller 16 is able to determine the posture of the user and instruct the display device 30 to present corresponding VR contents, such as associated with the user punching an object.

Figure 8A:
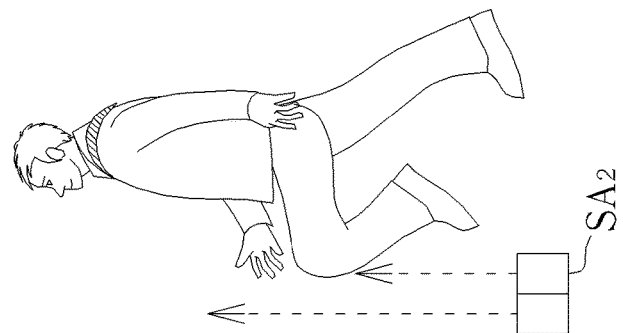
FIGS. 8A~8B are diagrams illustrating the operation of a limb movement detector in the gaming operational stage according to an embodiment of the present invention.
Figure 8A:
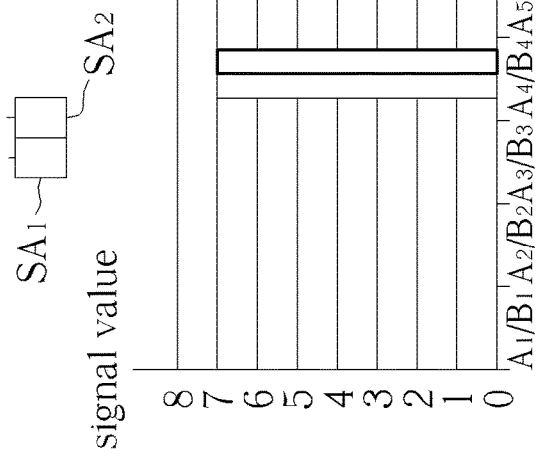
Figure 8B:
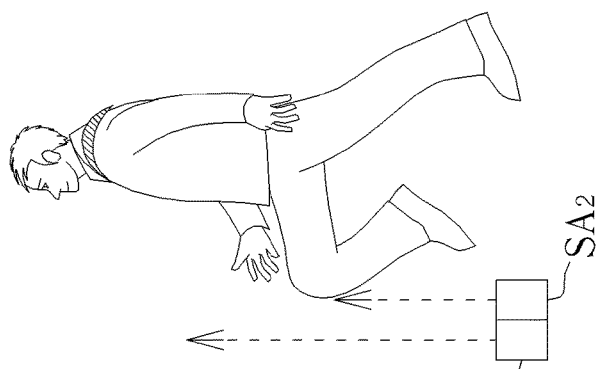
Figure 8B:
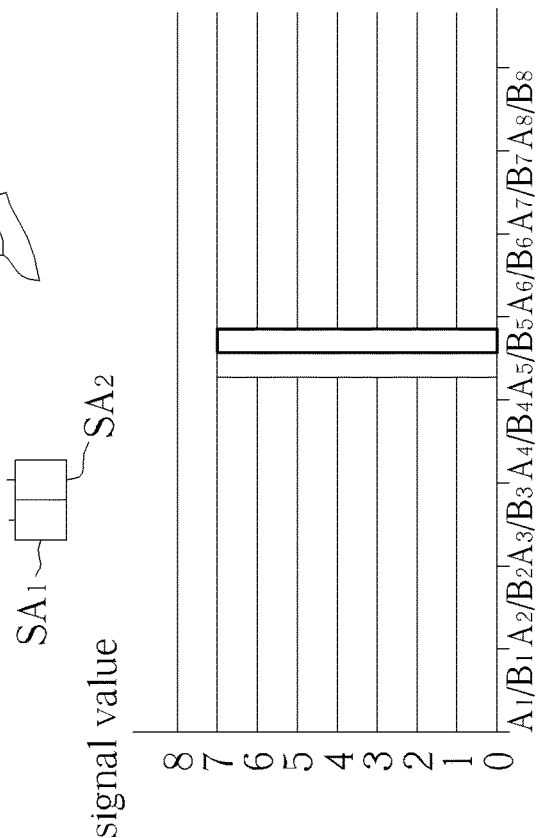

FIGS. 8A~8B are diagrams illustrating the operation of the limb movement detector 40 according to an embodiment of the present invention. On the top of FIGS. 8A~8B, a user raises his right leg and raises his left leg on the standing platform 20, respectively. On the bottom of FIGS. 8A~8B, the signals measured by each distance sensor of the distance sensing array $SA_1 \sim SA_2$ associated with corresponding user postures are depicted. As depicted in FIG. 8A when the user raises his right leg, only the corresponding distance sensors A5 and B5 in the distance sensing array $SA_1 \sim SA_2$ detect an obstacle. As depicted in FIG. 8B when the user raises his left leg, only the corresponding distance sensors A4 and B4 in the distance sensing array $SA_1 \sim SA_2$ detect an obstacle. According the signals measured by the distance sensing array $SA_1 \sim SA_P$, the micro controller 16 is able to determine the posture of the user and instruct the display device 30 to present corresponding VR contents, such as associated with the user kicking an object away.

FIGS. 9A~9B are diagrams illustrating the operation of the limb movement detector 40 according to an embodiment of the present invention. On the top of FIGS. 9A~9B, a user waves his hands laterally. On the bottom of FIGS. 9A~9B, the signals measured by each distance sensor of the distance sensing array $SA_1$~$SA_2$ associated with corresponding user postures are depicted. As depicted in FIGS. 9A~9B, regarding an obstacle at a specific height, the plurality of distance sensors in the distance sensing array $SA_1$~$SA_2$ may detect the location of the obstacle in the horizontal direction. That is, only the distance sensors whose locations correspond to the current locations of user hands provide non-zero signals. According the signals measured by the distance sensing array $SA_1$~$SA_N$, the micro controller 16 is able to determine the posture of the user and instruct the display device 30 to present corresponding VR contents.

When a VR application involves both hand gestures and leg gestures, the present limb movement detector 40 may operate with interval criteria. For example, when a distance sensor detects an obstacle located at a height between 0~80 cm, the micro controller 16 determines that the obstacle is associated with a leg movement of the user; when a distance sensor detects an obstacle located at a height larger than 80 cm, the micro controller 16 determines that the obstacle is associated with a hand movement of the user.

In the gaming operational stage 100 of the present invention, the eye-gaze analyzer 50 includes photo interrupter arrays $SL_1$~$SL_S$ (S is an integer larger than 1), photo interrupter arrays $SR_1$~$SR_S$, and two distance sensing arrays SC1~SC2. The photo interrupter arrays $SL_1$~$SL_S$ and $SR_1$~$SR_S$ are configured to detect the body posture (body orientation, standing or squatting) of a user on the standing platform 20. The distance sensing arrays SC1~SC2 are configured to detect the body orientation of a user on the standing platform 20.

Figure 10B:
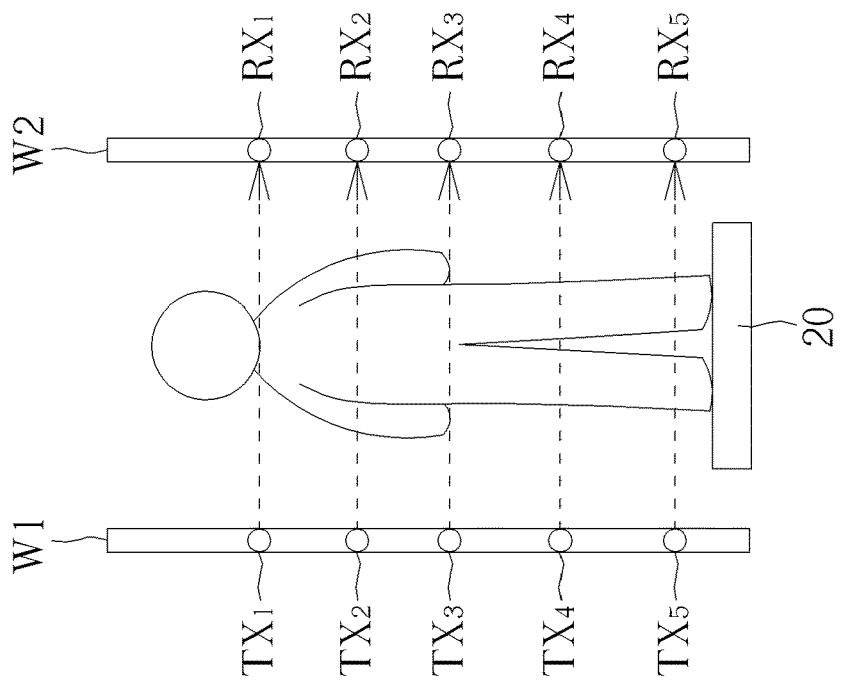
FIG. 10B is a side-view diagram illustrating an implementation of photo interrupter arrays in an eye-gaze analyzer of the gaming operational stage according to an embodiment of the present invention.
Figure 10A:
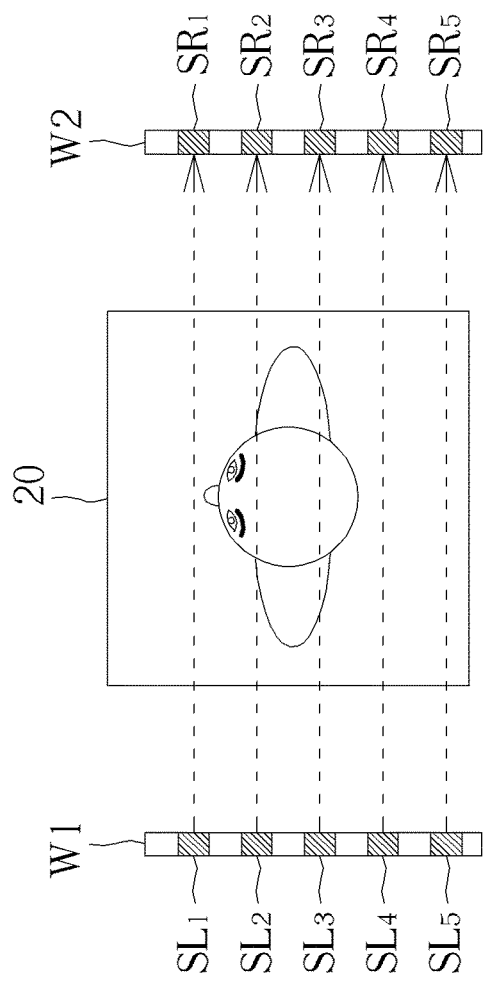
FIG. 10A is a top-view diagram illustrating an implementation of photo interrupter arrays in an eye-gaze analyzer according to an embodiment of the present invention.

FIG. 10A is a top-view diagram illustrating an implementation of the photo interrupter arrays in the eye-gaze analyzer 50 according to an embodiment of the present invention. FIG. 10B is a side-view diagram illustrating an implementation of the photo interrupter arrays in the eye-gaze analyzer 50 according to an embodiment of the present invention. Two walls W1 and W2 may be disposed on the left side and the right side of the user on the standing platform 20 for accommodating the photo interrupter arrays $SL_1$~$SL_S$ and $SR_1$~$SR_S$, respectively. Each of the photo interrupter arrays $SL_1$~$SL_S$ includes photo interrupters $TX_1$~$TX_T$ (T is an integer larger than 1), and each of the photo interrupter arrays $SR_1$~$SR_S$ includes photo interrupters $RX_1$~$RX_T$. Each photo interrupter array among the photo interrupter arrays $SL_1$~$SL_S$ and a corresponding photo interrupter array among the photo interrupter arrays $SR_1$~$SR_S$ form scan walls along the horizontal direction, as represented by dotted arrows in FIG. 10A. The photo interrupters $TX_1$~$TX_T$ in each photo interrupter array among the photo interrupter arrays $SL_1$~$SL_S$ and the photo interrupters $RX_1$~$RX_T$ in a corresponding photo interrupter array among the photo interrupter arrays $SR_1$~$SR_S$ form scan walls in the vertical direction, as represented by dotted arrows in FIG. 10B. For illustrative purpose, FIGS. 10A and 10B depict the embodiment when S=T=5. However, the amount of the photo interrupters and the distance sensors in the eye-gaze analyzer 50 does not limit the scope of the present invention.

Figure 11:
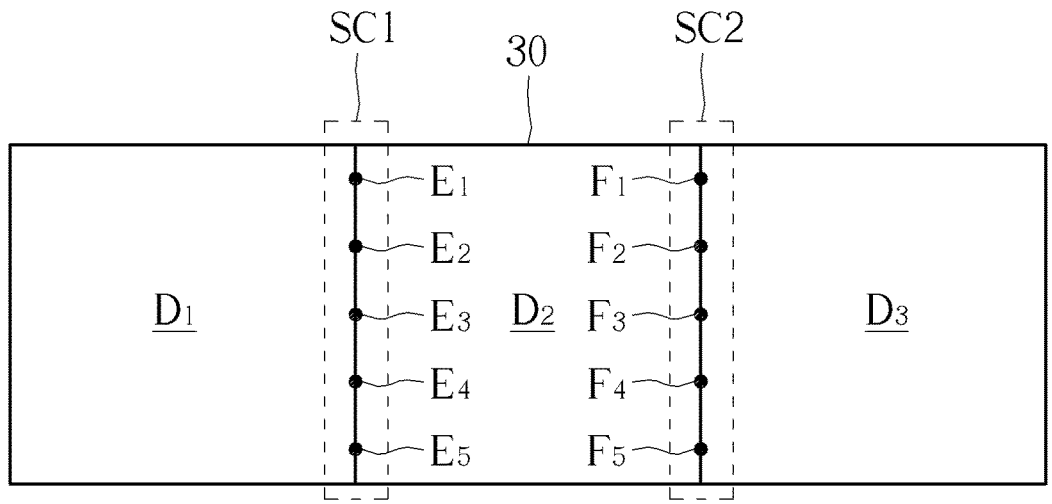
FIG. 11 is a diagram illustrating an embodiment of distance sensing arrays in an eye-gaze analyzer of the gaming operational stage according to an embodiment of the present invention.

FIG. 11 is a diagram illustrating an embodiment of the distance sensing arrays SC1~SC2 in the eye-gaze analyzer 50 according to an embodiment of the present invention. The distance sensing array SC1 includes a plurality of distance sensors $E_1$~$E_W$ (W is an integer larger than 1) disposed on the left side of the central screen $D_2$ in the display device 30. The distance sensing array SC2 includes a plurality of distance sensors $F_1$~$F_W$ disposed on the right side of the central screen $D_2$ in the display device 30. For illustrative purpose, FIG. 11 depicts the embodiment when W=5. However, the amount of the distance sensors in the eye-gaze analyzer 50 does not limit the scope of the present invention.

Figure 12A:
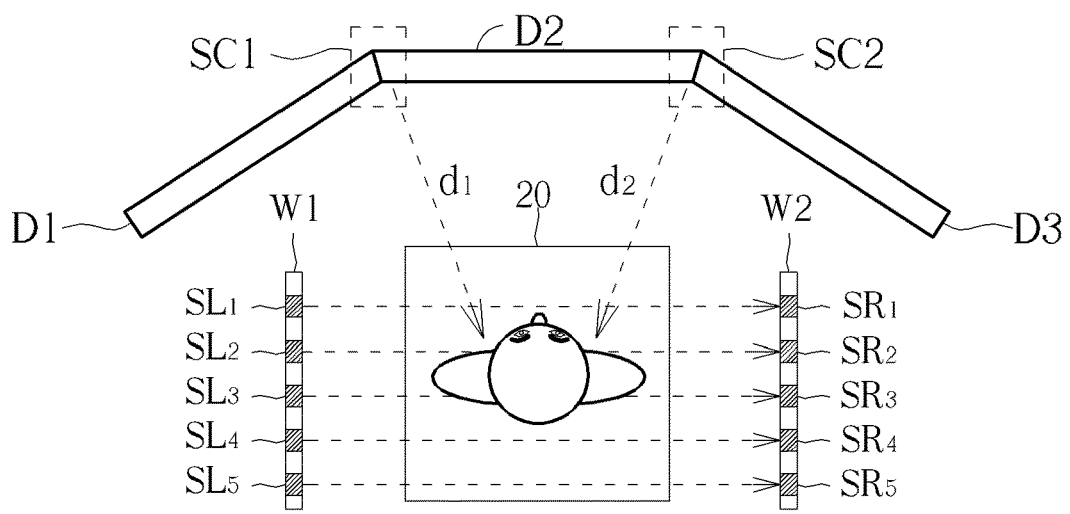
FIGS. 12A~12C are diagrams illustrating the operation of an eye-gaze analyzer in the gaming operational stage according to an embodiment of the present invention.
Figure 12B:
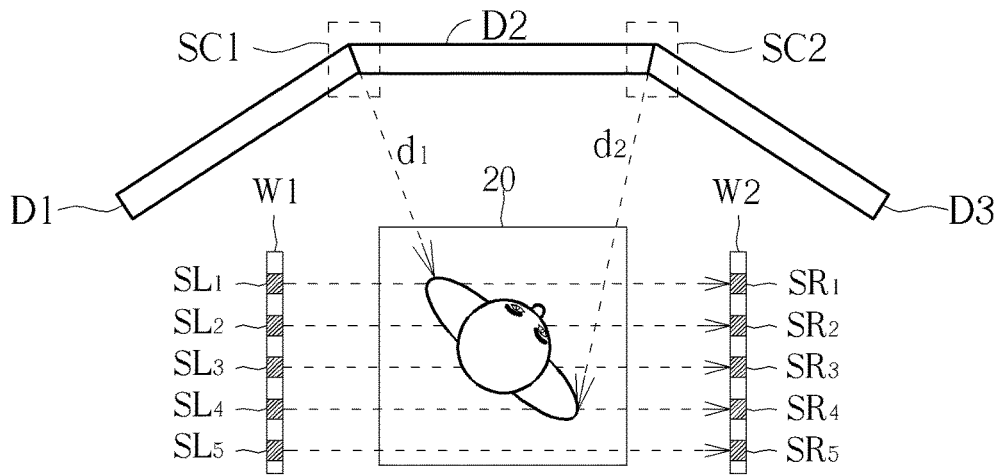
Figure 12C:
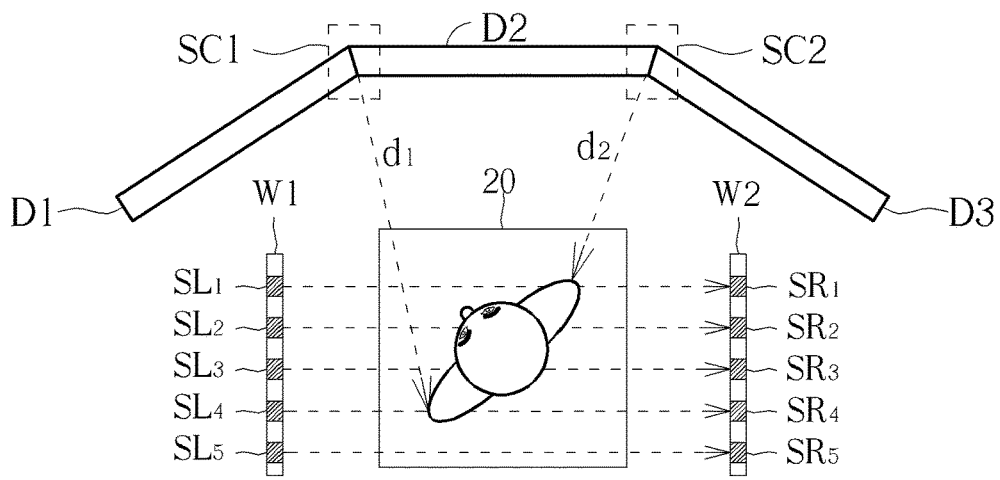

FIGS. 12A~12C are diagrams illustrating the operation of the eye-gaze analyzer 50 according to an embodiment of the present invention. On the top of FIGS. 12A~21C, a user on the standing platform 20 faces directly ahead, turns right and turns left, respectively. On the bottom of FIGS. 12A~12C, the signals measured by two photo interrupter arrays and two distance sensing arrays associated with corresponding user postures are depicted. As depicted in FIG. 12A when the user faces directly ahead, the thickness of user body blocks the photo interrupter arrays $SL_2$~$SL_3$ and $SR_2$~$SR_3$ (represented by "O" on the bottom of FIG. 12A), while there is no obstacle between the photo interrupter arrays $SL_1$ and $SR_1$, between the photo interrupter arrays $SL_4$ and $SR_4$ and between the photo interrupter arrays $SL_5$ and $SR_5$ (represented by "X" on the bottom of FIG. 12A), and the distance d1 measured by the distance sensing array SC1 is equal to the distance d2 measured by the distance sensing array SC2. As depicted in FIG. 12B when the user turns right, the thickness of user body increases and blocks the photo interrupter arrays $SL_1$~$SL_4$ and $SR_1$~$SR_4$ (represented by "O" on the bottom of FIG. 12B), while there is no obstacle between the photo interrupter arrays $SL_5$ and $SR_5$ (represented by "X" on the bottom of FIG. 12B), and the distance d1 measured by the distance sensing array SC1 is smaller than the distance d2 measured by the distance sensing array SC2. As depicted in FIG. 12C when the user turns left, the thickness of user body increases and blocks the photo interrupter arrays $SL_1$~$SL_4$ and $SR_1$~$SR_4$ (represented by "O" on the bottom of FIG. 12C), while there is no obstacle between the photo interrupter arrays $SL_5$ and $SR_5$ (represented by "X" on the bottom of FIG. 12C), and the distance d1 measured by the distance sensing array SC1 is larger than the distance d2 measured by the distance sensing array SC2. According the signals measured by the eye-gaze analyzer 50, the micro controller 16 is able to determine the body orientation of the user and instruct each screen in the display device 30 to present corresponding VR contents.

Figure 13B:
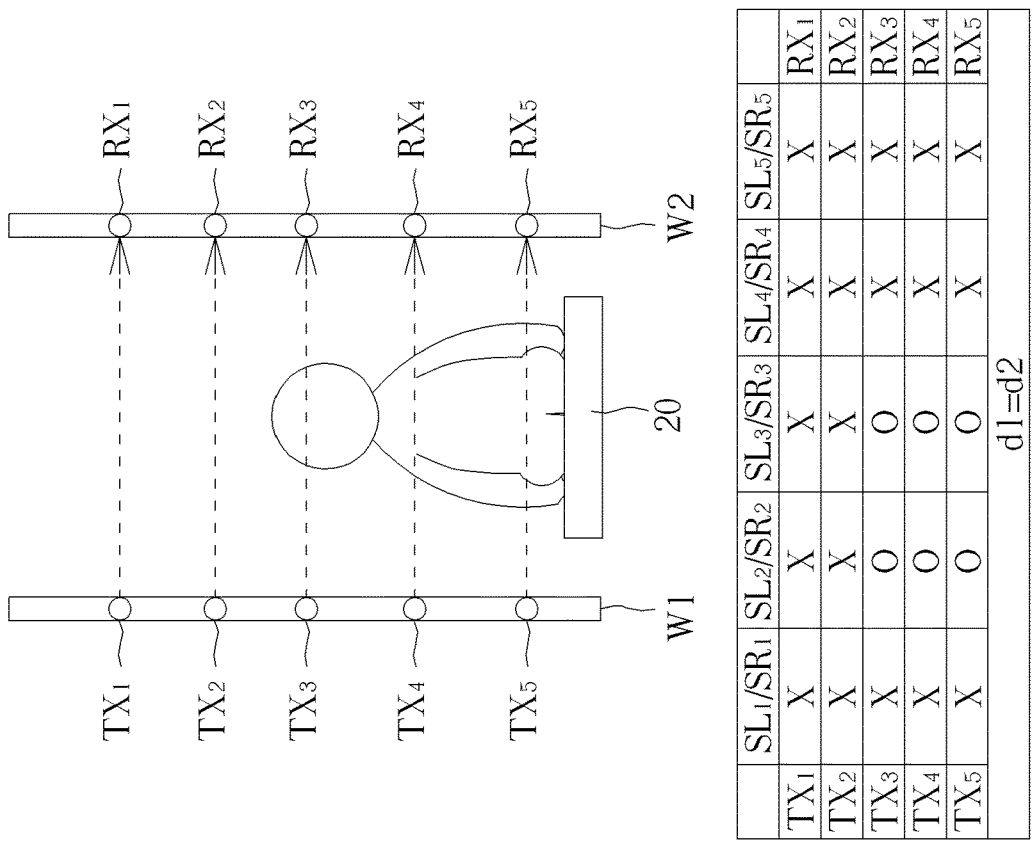
FIGS. 13A~13B are diagrams illustrating the operation of an eye-gaze analyzer in the gaming operational stage according to an embodiment of the present invention.
Figure 13A:
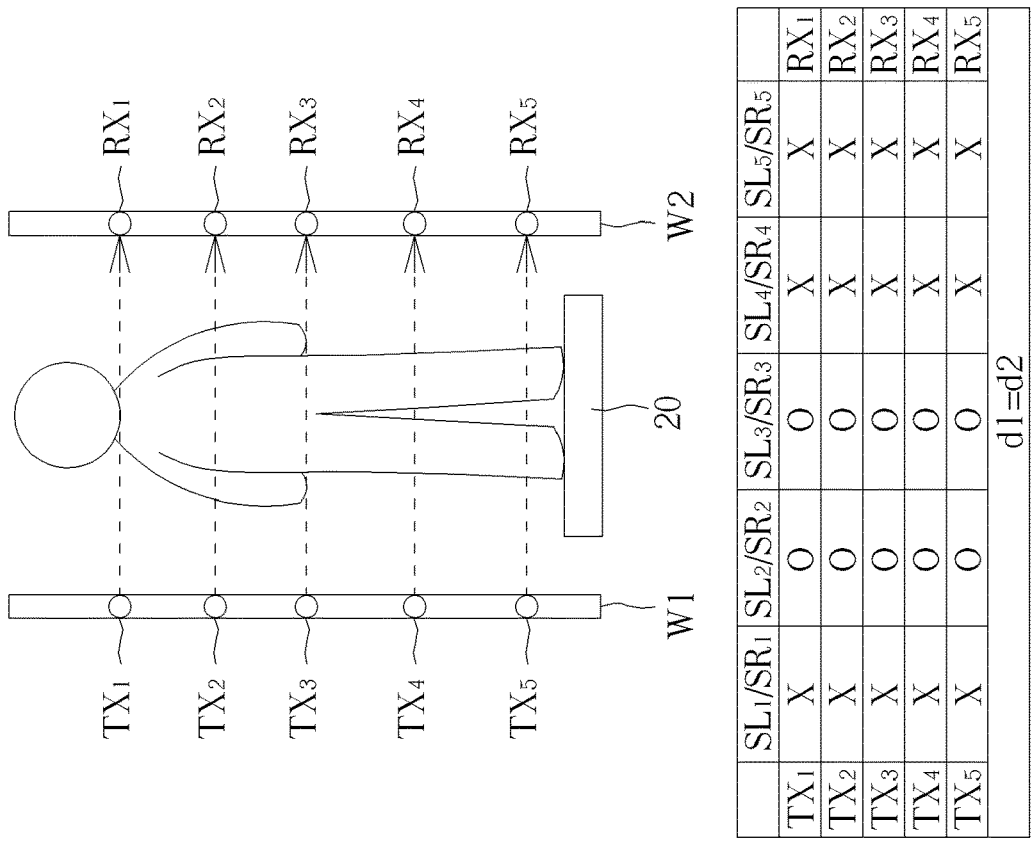

FIGS. 13A~13B are diagrams illustrating the operation of the eye-gaze analyzer 50 according to an embodiment of the present invention. On the top of FIGS. 13A~13B, a user stands and squats on the standing platform 20, respectively. On the bottom of FIGS. 13A~13B, the signals measured by two photo interrupter arrays and two distance sensing arrays associated with corresponding user postures are depicted. As depicted in FIG. 13A when the user stands facing directly ahead, the thickness of user body blocks all photo interrupters $TX_1$~$TX_5$ and $RX_1$~$RX_5$ in the photo interrupter arrays $SL_2$~$SL_3$ and $SR_2$~$SR_3$, and the distance d1 measured by the distance sensing array SC1 is equal to the distance d2 measured by the distance sensing array SC2. As depicted in FIG. 13B when the user squats down facing directly ahead, the thickness of user body blocks the photo interrupters $TX_3$~$TX_5$ in the photo interrupter array $SL_2$ and the photo interrupters $RX_3$~$RX_5$ in the photo interrupter arrays $SR_2$~$SR_3$, and the distance d1 measured by the distance sensing array SC1 is equal to the distance d2 measured by the distance sensing array SC2. According the signals measured by the eye-gaze analyzer 50, the micro controller 16 is able to determine the body orientation of the user and instruct each screen in the display device 30 to present corresponding VR contents, such as associated with the user squatting down to dodge an object.

The present gaming operational stage 100 may directly applied to certain VR applications, such as functioning as a dancing stage in music games or a treadmill/ski machine in sport games. In other VR applications, a body holder may further be disposed on the operational stage 20 of the gaming operational stage 100. In an example of a combat game, a turret may be disposed on the operational stage 20 to simulate shooting on a tank. In an example of a racing game, a driver seat or a motorcycle mount may be disposed on the operational stage 20 to simulate driving a car or riding a motorcycle. In an example of a flying game, a body mount may be disposed on the operational stage 20 so that the user can lie on the body mount for simulating sky-jumping or paragliding.

In conclusion, regarding the three main actions of character movement, behavior triggering and view-switching in VR applications, the gaming operational stage of the present invention is able to determine the center of gravity, the hand/leg gesture and body orientation of the user. For different VR applications, the user only needs to add or change a corresponding body holder to the gaming operational stage, thereby providing high compatibility.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gaming operational stage for a virtual reality (VR) application, comprising:
    a display device;
    a standing platform, comprising:
        a base;
        a universal bearing configured to accommodate the base and provide a first degree of freedom and a second degree of freedom when a user is on the base;
        a plurality of auxiliary springs disposed between a lower side of the base and a reference ground for sustaining a balance of the base; and
        a plurality of first distance sensors disposed on the lower side of the base for detecting distances between the reference ground and a plurality of locations on the base;
    a limb movement detector comprising at least one distance sensing array and disposed on the reference ground between the standing platform and the display device for detecting a limb movement of the user on the standing platform; and
    a system end, comprising:
        a host configured to provide an audio/video data required to run the VR application; and
        a micro controller configured to control the display device to present a corresponding content of the VR application according to distance information provided by the plurality of first distance sensors.

2. The gaming operational stage of claim 1, further comprising an adjusting device configured to provide a third degree of freedom according to the audio/video data when the user is on the base.

3. The gaming operational stage of claim 2, wherein the adjusting device includes a lever and a power device, and the micro controller is configured to control the power device to elevate the lever, thereby compressing a corresponding auxiliary spring among the plurality of auxiliary springs for providing a force feedback or a vibration required by the VR application.

4. The gaming operational stage of claim 1, wherein:
    when a first distance detected by one of the plurality of first distance sensors disposed on the lower side of the base at a first location is smaller than a second distance detected by one of the plurality of first distance sensors disposed on the lower side of the base at a second location, the micro controller is further configured to present the corresponding content of the VR application associated with a user on the base leaning forward;
    when the first distance detected by one of the plurality of first distance sensors disposed on the lower side of the base at the first location is larger than the second distance detected by one of the plurality of first distance sensors disposed on the lower side of the base at the second location, the micro controller is further configured to present the corresponding content of the VR application associated with the user on the standing platform leaning backward;
    the first location is in front of the user on the base; and
    the second location is behind the user on the base.

5. The gaming operational stage of claim 1, wherein:
    when a first distance detected by one of the plurality of first distance sensors disposed on the lower side of the base at a first location is smaller than a second distance detected by one of the plurality of first distance sensors disposed on the lower side of the base at a second location, the micro controller is further configured to present the corresponding content of the VR application associated with a user on the base leaning towards right;
    when the first distance detected by one of the plurality of first distance sensors disposed on the lower side of the base at the first location is larger than the second distance detected by one of the plurality of first distance sensors disposed on the lower side of the base at the second location, the micro controller is further configured to present the corresponding content of the VR application associated with the user on the base leaning towards left;
    the first location is on a right side of the user on the base; and
    the second location is on a left side the user on the base.

6. The gaming operational stage of claim 1, wherein the at least one distance sensing array includes a plurality of second distance sensors facing upwards and configured to detect an obstacle between the standing platform and the display device, and the micro controller is further configured to control the display device to present the corresponding content of the VR application according to distance information provided by the plurality of second distance sensors.

7. The gaming operational stage of claim 1, wherein
    when detecting an obstacle between the standing platform and the display device, the micro controller is further configured to acquire a distance between the obstacle and the reference ground; and
    the micro controller determines that the obstacle is associated with a hand movement of the user when the distance between the obstacle and the reference ground is greater than a predetermined value.

8. The gaming operational stage of claim 1, wherein
    when detecting an obstacle between the standing platform and the display device, the micro controller is further configured to acquire a distance between the obstacle and the reference ground; and the micro controller determines that the obstacle is associated with a leg movement of the user when the distance between the obstacle and the reference ground is not greater than a predetermined value.

9. The gaming operational stage of claim 6, wherein:
when one of the plurality of second distance sensors located at a first location detects the obstacle and one of the plurality of second distance sensors located at a second location does not detect any obstacle, the micro controller is further configured to present the corresponding content of the VR application associated with a right-hand movement or a right-leg movement of a user on the standing platform;
the first location is on a right side of the user on the base; and
the second location is on a left side the user on the base.

10. The gaming operational stage of claim 6, wherein:
when one of the plurality of second distance sensors located at a first location detects the obstacle and one of the plurality of second distance sensors located at a second location does not detect any obstacle, the micro controller is further configured to present the corresponding content of the VR application associated with a left-hand movement or a left-leg movement of a user on the base;
the first location is on a left side of the user on the standing platform; and
the second location is on a right side the user on the standing platform.

11. A gaming operational stage for a virtual reality (VR) application comprising:
a display device;
a standing platform, comprising:
a base;
a universal bearing configured to accommodate the base and provide a first degree of freedom and a second degree of freedom when a user is on the base;
a plurality of auxiliary springs disposed between a lower side of the base and a reference ground for sustaining a balance of the base; and
a plurality of first distance sensors disposed on the lower side of the base for detecting distances between the reference ground and a plurality of locations on the base;
an eye-gaze analyzer which includes:
a plurality of first photo interrupter arrays disposed on a left side of a user on the base and configured to detect a body orientation of the user on the base;
a plurality of second photo interrupter arrays disposed on a right side of the user on the base and configured to detect the body orientation of the user on the base;
a first distance sensing array disposed on a first side of a screen in the display device and configured to detect an eye-gaze variation of the user on the base; and
a second distance sensing array disposed on a second side of the screen and configured to detect the eye-gaze variation, wherein the first side and the second side are opposite sides of the screen; and
a system end, comprising:
a host configured to provide an audio/video data required to run the VR application; and
a micro controller configured to control the display device to present a corresponding content of the VR application according to distance information provided by the plurality of first distance sensors.

12. The gaming operational stage of claim 11, further comprising:
a first wall disposed on the reference ground and located on the left side of the user on the base for accommodating the plurality of first photo interrupter arrays; and
a second wall disposed on the reference ground and located on the right side of the user on the base for accommodating the plurality of second photo interrupter arrays.

13. The gaming operational stage of claim 11, wherein:
each first photo interrupter array includes a plurality of first photo interrupters;
each second photo interrupter array includes a plurality of second photo interrupters;
when a body thickness of the user on the base only blocks a first number of the first photo interrupters in the plurality first photo interrupter arrays and a second number of the second photo interrupters in the plurality second photo interrupter arrays, the micro controller is further configured to present the corresponding content of the VR application associated with the user squatting down;
distances between the first number of the first photo interrupters and the reference ground are smaller than a predetermined value; and
distances between the second number of the second photo interrupters and the reference ground are smaller than the predetermined value.

14. The gaming operational stage of claim 11, wherein:
the first distance sensing array is disposed on a right side of the screen in the display device;
the second distance sensing array is disposed on a left side of the screen in the display device;
when a first distance measured by the first distance sensing array is equal to a second distance measured by the second distance sensing array, the micro controller is further configured to present the corresponding content of the VR application associated with the user on the base facing directly to the screen.

15. The gaming operational stage of claim 11, wherein:
the first distance sensing array is disposed on a right side of the screen in the display device;
the second distance sensing array is disposed on a left side of the screen in the display device;
when a first distance measured by the first distance sensing array is equal to a second distance measured by the second distance sensing array and when a body thickness of the user on the base does not block all the plurality of first and second photo interrupter arrays, the micro controller is further configured to present the corresponding content of the VR application associated with the user on the base directly facing the screen.

16. The gaming operational stage of claim 11, wherein:
the first distance sensing array is disposed on a right side of the screen in the display device;
the second distance sensing array is disposed on a left side of the screen;
when a first distance measured by the first distance sensing array is larger than a second distance measured by the second distance sensing array, the micro controller is further configured to present the corresponding content of the VR application associated with the user on the base facing towards the right side of the screen.

17. The gaming operational stage of claim 11, wherein:
the first distance sensing array is disposed on a right side of the screen in the display device;

the second distance sensing array is disposed on a left side of the screen in the display device;

when a first distance measured by the first distance sensing array is larger than a second distance measured by the second distance sensing array and when a body thickness of the user on the base blocks all the plurality of first and second photo interrupter arrays, the micro controller is further configured to present the corresponding content of the VR application associated with the user on the base facing towards the right side of the screen.

18. The gaming operational stage of claim 11, wherein:
the first distance sensing array is disposed on a right side of the screen in the display device;
the second distance sensing array is disposed on a left side of the screen in the display device;
when a first distance measured by the first distance sensing array is smaller than a second distance measured by the second distance sensing array, the micro controller is further configured to present the corresponding content of the VR application associated with the user on the base facing towards the left side of the screen.

19. The gaming operational stage of claim 11, wherein:
the first distance sensing array is disposed on a right side of the screen in the display device;
the second distance sensing array is disposed on a left side of the screen in the display device;
when a first distance measured by the first distance sensing array is smaller than a second distance measured by the second distance sensing array and when a body thickness of the user on the base blocks all the plurality of first and second photo interrupter arrays, the micro controller is further configured to present the corresponding content of the VR application associated with the user on the base facing towards the left side of the screen.

* * * * *